US012549107B2

(12) United States Patent
Ruppert (10) Patent No.: US 12,549,107 B2
(45) Date of Patent: Feb. 10, 2026

(54) CHARGING DEVICE FOR A MOTOR VEHICLE

(71) Applicant: AUDI AG, Ingolstadt (DE)

(72) Inventor: Daniel Ruppert, Lenting (DE)

(73) Assignee: AUDI AG, Ingolstadt (DE)

( * ) Notice: Subject to any disclaimer, the term of this patent is extended or adjusted under 35 U.S.C. 154(b) by 106 days.

(21) Appl. No.: 16/287,039

(22) Filed: Feb. 27, 2019

(65) Prior Publication Data

US 2019/0275905 A1 Sep. 12, 2019

(30) Foreign Application Priority Data

Mar. 6, 2018 (DE) .......................... 102018203263.7

(51) Int. Cl.
*H02M 3/335* (2006.01)
*B60L 1/00* (2006.01)
(Continued)

(52) U.S. Cl.
CPC ........... *H02M 3/33561* (2013.01); *B60L 1/00* (2013.01); *B60L 50/51* (2019.02); *B60L 53/11* (2019.02);
(Continued)

(58) Field of Classification Search
CPC .......... B60L 53/22; B60L 53/12; B60L 53/14; B60L 53/11; B60L 1/00; B60L 58/20;
(Continued)

(56) References Cited

U.S. PATENT DOCUMENTS 4,260,230 A * 4/1981 Suzuki ..................... G03B 7/26
320/108
5,633,577 A * 5/1997 Matsumae ........ H02M 3/33592
320/138
(Continued)

FOREIGN PATENT DOCUMENTS

CN 102092351 A 6/2011
CN 102791515 A 11/2012
(Continued)

OTHER PUBLICATIONS

Examination Report issued on Dec. 11, 2018 in corresponding German Application No. 102018203263.7; 24 pages.
(Continued)

*Primary Examiner* — John T Trischler
(74) *Attorney, Agent, or Firm* — Maier & Maier, PLLC (57) ABSTRACT

A charging device for a motor vehicle, having a charging terminal for the energetic coupling to a motor-vehicle-external charging station, a high-voltage terminal for the electrical connection of the charging device to a high-voltage vehicle electrical system of the motor vehicle, and a charging device energy converter electrically coupled to the charging terminal and the high-voltage terminal. The charging device energy converter, for converting electrical energy between the charging terminal and the high-voltage terminal, has an electrical inductor as an electrical energy accumulator, which is at least partially formed as an electronic main coil. A low-voltage terminal for connection to a low-voltage vehicle electrical system of the motor vehicle and an electronic auxiliary coil, which is magnetically coupled to the main coil and electrically coupled to the low-voltage terminal and which is designed to provide electrical energy for the low-voltage vehicle electrical system.

19 Claims, 5 Drawing Sheets

(51) Int. Cl.
*B60L 50/51* (2019.01)
*B60L 53/10* (2019.01)
*B60L 53/12* (2019.01)
*B60L 53/14* (2019.01)
*B60L 53/16* (2019.01)
*B60L 53/22* (2019.01)
*B60L 58/20* (2019.01)
*H02M 1/42* (2007.01)
*H02M 3/00* (2006.01)
*H02M 1/00* (2006.01)

(52) U.S. Cl.
CPC ............... *B60L 53/12* (2019.02); *B60L 53/14* (2019.02); *B60L 53/16* (2019.02); *B60L 53/22* (2019.02); *B60L 58/20* (2019.02); *H02M 1/4225* (2013.01); *H02M 3/01* (2021.05); *H02M 3/33573* (2021.05); *B60L 2210/10* (2013.01); *B60L 2210/30* (2013.01); *B60L 2210/40* (2013.01); *B60L 2210/42* (2013.01); *H02M 1/007* (2021.05); *Y02T 10/7072* (2013.01)

(58) Field of Classification Search
CPC ...... B60L 53/16; B60L 50/51; B60L 2210/30; B60L 2210/40; B60L 2210/10; B60L 2210/42; H02M 3/33561; H02M 1/4225; H02M 3/33569; H02M 2001/007
USPC .......................................... 320/109, 103, 104
See application file for complete search history.

(56) References Cited

U.S. PATENT DOCUMENTS

| | | | | |
|---|---|---|---|---|
| 6,087,802 A * | 7/2000 | James | ............... | B60L 53/14 323/266 |
| 6,297,616 B1 * | 10/2001 | Kubo | ............... | B60L 58/21 320/116 |
| 6,498,456 B2 * | 12/2002 | Ettes | ............... | H01F 38/14 320/108 |
| 6,694,438 B1 * | 2/2004 | Porter | ............... | G06F 1/26 363/27 |
| 6,744,642 B2 * | 6/2004 | Hung | ............... | H02M 1/34 363/21.06 |
| 7,110,266 B1 * | 9/2006 | Porter | ............... | H02M 1/088 363/21.01 |
| 7,330,360 B2 * | 2/2008 | Lee | ............... | H02M 3/158 363/21.16 |
| 7,447,050 B2 * | 11/2008 | Stefanutti | ............... | H02M 7/12 336/170 |
| 7,696,733 B2 * | 4/2010 | Osaka | ............... | H02M 3/33561 307/17 |
| 7,768,801 B2 * | 8/2010 | Usui | ............... | H02M 3/33576 363/21.06 |
| 7,796,410 B2 * | 9/2010 | Takayanagi | ............... | B60L 58/20 363/37 |
| 7,816,895 B2 * | 10/2010 | Hsiao | ............... | H02M 3/33561 363/21.04 |
| 8,030,882 B2 * | 10/2011 | Ito | ............... | H02J 7/022 307/66 |
| 8,203,232 B2 * | 6/2012 | Pino | ............... | B60L 3/0069 307/10.1 |
| 8,223,520 B2 * | 7/2012 | Aso | ............... | H02M 3/33561 363/97 |
| 8,536,732 B2 * | 9/2013 | Lee | ............... | H02M 3/33561 307/31 |
| 8,629,627 B2 * | 1/2014 | Cohen | ............... | H02M 3/33561 315/276 |
| 8,692,512 B2 * | 4/2014 | Tanikawa | ............... | B60L 58/20 320/109 |
| 8,742,718 B2 * | 6/2014 | Sugiyama | ............... | B60L 53/20 320/140 |
| 8,860,363 B2 * | 10/2014 | Ang | ............... | B60L 1/02 320/132 |
| 8,963,482 B2 * | 2/2015 | Ang | ............... | H02J 7/02 320/103 |
| 9,145,063 B2 * | 9/2015 | Welschholz | ............... | H02J 50/90 |
| 9,193,272 B2 * | 11/2015 | Fassnacht | ............... | B60L 53/14 |
| 9,300,148 B2 * | 3/2016 | Oh | ............... | H02J 7/0013 |
| 9,444,285 B2 * | 9/2016 | Kamiya | ............... | H02J 7/02 |
| 9,514,875 B2 * | 12/2016 | Worek | ............... | H01F 27/38 |
| 9,744,857 B2 * | 8/2017 | Eifert | ............... | B60L 3/00 |
| 9,931,940 B2 * | 4/2018 | Parga-Cacheiro | ............... | B60T 7/12 |
| 9,931,951 B2 * | 4/2018 | Khaligh | ............... | B60L 55/00 |
| 9,944,190 B2 * | 4/2018 | Lewis | ............... | B60L 53/12 |
| 9,969,281 B2 * | 5/2018 | Nakamura | ............... | B60L 53/36 |
| 9,985,531 B2 * | 5/2018 | Haggenmiller | ............... | H02M 3/33507 |
| 10,005,370 B2 * | 6/2018 | Murasato | ............... | B60L 58/20 |
| 10,020,658 B2 * | 7/2018 | Purcarea | ............... | B60L 53/14 |
| 10,035,423 B2 * | 7/2018 | Lasagni | ............... | B60L 53/22 |
| 10,232,718 B2 * | 3/2019 | Trunk | ............... | B60L 53/20 |
| 10,389,258 B2 * | 8/2019 | Njiende | ............... | H02M 3/285 |
| 10,424,436 B2 * | 9/2019 | Nieto | ............... | B60L 53/22 |
| 10,461,553 B2 * | 10/2019 | Shimada | ............... | H02M 3/155 |
| 10,492,283 B2 * | 11/2019 | Leibl | ............... | H02M 3/33573 |
| 10,498,146 B2 * | 12/2019 | Wu | ............... | H02J 7/007 |
| 10,696,182 B2 * | 6/2020 | Khaligh | ............... | H02M 3/33561 |
| 10,811,975 B1 * | 10/2020 | Bala | ............... | H02M 3/33569 |
| 10,833,594 B2 * | 11/2020 | Leong | ............... | H02M 3/33523 |
| 10,862,374 B2 * | 12/2020 | Sudan | ............... | H02K 11/0094 |
| 11,025,160 B2 * | 6/2021 | Joo | ............... | H02M 1/4208 |
| 11,056,909 B2 * | 7/2021 | Ghosh | ............... | H02M 3/33523 |
| 11,165,290 B2 * | 11/2021 | Takahashi | ............... | H02K 1/18 |
| 11,489,366 B2 * | 11/2022 | Kahlman | ............... | H02J 50/80 |
| 11,901,826 B2 * | 2/2024 | Zhang | ............... | G01R 19/175 |
| 2004/0070997 A1 * | 4/2004 | Hung | ............... | H02M 3/33561 363/21.06 |
| 2004/0257836 A1 * | 12/2004 | Porter | ............... | H02M 3/158 363/21.01 |
| 2006/0181904 A1 * | 8/2006 | Lee | ............... | H02M 3/33561 363/21.12 |
| 2008/0049453 A1 * | 2/2008 | Osaka | ............... | H02M 3/33561 363/21.02 |
| 2008/0101096 A1 * | 5/2008 | Takayanagi | ............... | B60L 1/02 363/17 |
| 2008/0112195 A1 * | 5/2008 | Liang | ............... | H02M 3/33561 363/24 |
| 2008/0158921 A1 * | 7/2008 | Stefanutti | ............... | H02M 7/12 363/67 |
| 2008/0316774 A1 * | 12/2008 | Ito | ............... | B60L 53/14 363/17 |
| 2009/0103341 A1 * | 4/2009 | Lee | ............... | B60L 58/20 320/140 |
| 2009/0175055 A1 * | 7/2009 | Hsiao | ............... | H02M 3/33561 363/21.01 |
| 2009/0201700 A1 * | 8/2009 | Aso | ............... | H02M 3/33561 363/17 |
| 2009/0251925 A1 * | 10/2009 | Usui | ............... | H02M 3/33561 363/16 |
| 2011/0068740 A1 * | 3/2011 | Ang | ............... | H02J 7/022 320/109 |
| 2011/0140512 A1 * | 6/2011 | Pino | ............... | B60L 3/0023 307/9.1 |
| 2011/0316430 A1 * | 12/2011 | Cohen | ............... | H05B 45/382 363/16 |
| 2012/0049624 A1 * | 3/2012 | Lee | ............... | H02M 3/33561 307/31 |
| 2012/0049794 A1 * | 3/2012 | Han | ............... | B60L 58/26 320/109 |
| 2012/0068663 A1 * | 3/2012 | Tanikawa | ............... | B60L 58/20 320/109 |
| 2012/0235626 A1 * | 9/2012 | Oh | ............... | H02M 3/3353 320/103 |
| 2012/0280652 A1 * | 11/2012 | Welschholz | ............... | H02J 50/10 320/108 |
| 2012/0286720 A1 * | 11/2012 | Fassnacht | ............... | B60L 53/14 320/105 |
| 2013/0106195 A1 * | 5/2013 | Kusch | ............... | B60L 53/11 307/82 |

(56) References Cited

U.S. PATENT DOCUMENTS

| | | | | |
|---|---|---|---|---|
| 2013/0119932 A1* | 5/2013 | Moon | B60L 58/20 | 320/109 |
| 2013/0154667 A1* | 6/2013 | Scheu | B60L 58/00 | 324/617 |
| 2013/0200846 A1* | 8/2013 | Ang | B60L 1/003 | 320/109 |
| 2013/0221920 A1* | 8/2013 | Sugiyama | B60L 58/10 | 320/109 |
| 2013/0257375 A1* | 10/2013 | Ang | B60L 53/14 | 320/109 |
| 2013/0320911 A1* | 12/2013 | Kamiya | B60L 53/22 | 320/101 |
| 2014/0043127 A1* | 2/2014 | Worek | H01F 27/38 | 336/178 |
| 2014/0183942 A1* | 7/2014 | Sugiyama | B60L 15/007 | 307/10.1 |
| 2014/0253027 A1* | 9/2014 | Obayashi | H02J 7/00034 | 320/108 |
| 2014/0320078 A1* | 10/2014 | Nakamura | B60L 50/16 | 320/108 |
| 2015/0329001 A1* | 11/2015 | Eifert | H02J 7/34 | 320/109 |
| 2015/0372499 A1* | 12/2015 | Purcarea | B60L 1/003 | 307/104 |
| 2016/0016479 A1* | 1/2016 | Khaligh | B60L 11/1812 | 363/17 |
| 2016/0137073 A1* | 5/2016 | Krammer | H02J 50/10 | 320/108 |
| 2016/0257209 A1* | 9/2016 | Lewis | B60L 53/65 | |
| 2016/0263999 A1* | 9/2016 | Parga-Cacheiro | B60T 7/12 | |
| 2016/0280081 A1* | 9/2016 | Lasagni | B60L 50/51 | |
| 2017/0036559 A1* | 2/2017 | Murasato | B60L 53/63 | |
| 2017/0070126 A1* | 3/2017 | Sudan | H02P 9/10 | |
| 2017/0087997 A1* | 3/2017 | Trunk | B60L 53/20 | |
| 2017/0117731 A1* | 4/2017 | Shimada | H02M 3/28 | |
| 2017/0158067 A1* | 6/2017 | Reynolds | B60L 11/1816 | |
| 2017/0176916 A1* | 6/2017 | Kobayashi | H02M 3/33569 | |
| 2017/0282747 A1* | 10/2017 | Wang | B60L 53/22 | |
| 2017/0355270 A1* | 12/2017 | Elshaer | B60L 53/12 | |
| 2017/0358987 A1* | 12/2017 | Oouchi | B60L 53/22 | |
| 2018/0063932 A1* | 3/2018 | Leibl | H05G 1/12 | |
| 2018/0222333 A1* | 8/2018 | Khaligh | H02M 3/33584 | |
| 2018/0263557 A1* | 9/2018 | Kahlman | H02J 50/10 | |
| 2018/0309372 A1* | 10/2018 | Leong | H02M 1/08 | |
| 2018/0323720 A1* | 11/2018 | Njiende | H01F 27/38 | |
| 2018/0334045 A1* | 11/2018 | Bendani | B60L 53/22 | |
| 2018/0337610 A1* | 11/2018 | Leong | H02M 1/083 | |
| 2019/0071033 A1* | 3/2019 | Hinterberger | B60R 16/023 | |
| 2019/0103774 A1* | 4/2019 | Takahashi | H01F 27/263 | |
| 2019/0148973 A1* | 5/2019 | Kim | B60L 3/003 | 320/109 |
| 2019/0176652 A1* | 6/2019 | Teng | B60L 1/00 | |
| 2020/0023748 A1* | 1/2020 | Ruppert | G01R 31/006 | |
| 2020/0136500 A1* | 4/2020 | Joo | H02M 1/4208 | |
| 2020/0336068 A1* | 10/2020 | Bala | H02M 1/4233 | |
| 2021/0036536 A1* | 2/2021 | Ruppert | H02J 7/0013 | |
| 2021/0203236 A1* | 7/2021 | Zhang | H02M 3/33561 | |
| 2025/0135927 A1* | 5/2025 | Ammanamanchi | H02M 1/0077 | |

FOREIGN PATENT DOCUMENTS

| | | | |
|---|---|---|---|
| CN | 105226989 A | * | 1/2016 |
| CN | 107394855 A | * | 11/2017 |
| DE | 102009007737 A1 | | 8/2010 |
| DE | 102010026130 A1 | | 1/2012 |
| DE | 102010054927 A1 | | 6/2012 |
| DE | 102014201581 A1 | | 7/2015 |
| DE | 102014208326 A1 | | 11/2015 |
| DE | 102014209249 A | | 11/2015 |
| EP | 2567856 A1 | | 3/2013 |
| EP | 2 631 105 A1 | | 8/2013 |

OTHER PUBLICATIONS

European Search Report issued on Jul. 16, 2019, in corresponding European application No. 19158470.5 including partial machine-generated English language translation; 11 pages.

Examination Report issued on Aug. 21, 2020 in corresponding European Application No. 19 158 470.5; 12 pages including partial machine-generated English-language translation.

SAE EV Charging Systems Committee, "SAE J1772: SAE Electric Vehicle Conductive Charge Coupler", URL:http://www.arb.ca.gov/msprog/zevprog/stakeholders/infrastructure/ finalsaej1772.doc, issued Oct. 1996, revised Aug. 2001, 30 pages.

Office Action issued on Mar. 16, 2022 in corresponding Chinese Application No. 201910163904.9; 14 pages including English-language translation.

German Examination Report issued on Oct. 28, 2022, in connection with corresponding German Application No. 10 2018 203 263.7 (14 pp., including English-language translation).

Office Action issued on Sep. 2, 2022, in connection with corresponding Chinese Application No. 201910163904.9 (12 pp., including English-language translation).

* cited by examiner

-Prior Art-

CHARGING DEVICE FOR A MOTOR VEHICLE

FIELD

The invention relates to a charging device for a motor vehicle, having a charging terminal for the energetic coupling to a motor-vehicle-external charging station, a high-voltage terminal for electrically connecting the charging device to a high-voltage vehicle electrical system of the motor vehicle, and a charging device energy converter electrically coupled to the charging terminal and the high-voltage terminal, wherein the charging device energy converter has an electrical inductor as an electrical energy accumulator, which is at least partially formed as an electronic main coil, for converting electrical energy between the charging terminal and the high-voltage terminal. The invention furthermore relates to a motor vehicle having a high-voltage vehicle electrical system, a low-voltage vehicle electrical system, a charging device, which has a high-voltage terminal connected to the high-voltage vehicle electrical system and a charging terminal for the energetic coupling to a motor-vehicle-external charging station, and also a vehicle energy converter connected between the high-voltage vehicle electrical system and the low-voltage vehicle electrical system for electrically coupling the high-voltage vehicle electrical system and the low-voltage vehicle electrical system.

BACKGROUND

Charging devices of the generic type and also motor vehicles having such charging devices are extensively known in the prior art. The charging devices are used in motor vehicles in particular for being able to supply electrical energy to a vehicle electrical system of the motor vehicle, for example, the high-voltage vehicle electrical system or the like. This relates in particular to motor vehicles which are electrically drivable motor vehicles and have an electrical drive unit, which is used for the intended driving operation. If the motor vehicle exclusively has the electrical drive unit, it is an electric vehicle. If moreover another drive unit is additionally provided, for example, an internal combustion engine or the like, this is a hybrid vehicle in this case.

In particular in electrically drivable motor vehicles, a high-voltage vehicle electrical system is generally provided, which is used for supplying the electrical drive unit with electrical energy during the intended driving operation. For this purpose, the high-voltage vehicle electrical system comprises an electrical energy accumulator, which is typically designed as a rechargeable battery like a high-voltage battery. The high-voltage battery is designed, for example, as a lithium-ion rechargeable battery or the like. In addition, the electrical energy accumulator can also comprise, of course, a capacitor and combination circuits having high-voltage batteries and/or the like.

In the intended driving operation, the electrical energy accumulator provides the electrical energy required for the intended driving operation. The electrical energy accumulator is thus discharged during the intended driving operation. It is therefore necessary at regular intervals to be able to supply electrical energy to the electrical energy accumulator again. The charging device is provided for this purpose. To supply electrical energy, the motor vehicle is generally parked at a motor-vehicle-external charging station and the charging device is energetically coupled to this charging station. The charging station itself can in turn be electrically coupled to a public energy supply network for the provision of energy. In addition, of course, the charging station can also comprise separate energy sources, for example, solar cells, wind generators, fuel cells, combinations thereof, or the like.

The energetic coupling of the charging device to the motor-vehicle-external charging station can be implemented, for example, by means of a charging cable, by means of which a wired electrical energy coupling can be achieved. In addition, of course, the energetic coupling can also be produced wirelessly, for example using an alternating magnetic field or the like. Such a coupling is also called inductive coupling.

Motor vehicles which have a high-voltage vehicle electrical system generally additionally have a low-voltage vehicle electrical system. High-voltage in the meaning of this disclosure means an electrical DC voltage which is greater than approximately 60 V, preferably an electrical DC voltage as defined according to the norm ECE R 100, or the like. A vehicle electrical system, the rated voltage of which is less than approximately 60 V, is therefore a low-voltage vehicle electrical system.

Low-voltage vehicle electrical systems are typically used in motor vehicles to supply lower-power electrical consumers with electrical energy, for example, a car radio, a rear windshield heater, a ventilation fan, a seat heater, a vehicle interior light, vehicle headlights, and/or the like. In comparison to the electrical drive unit, these consumers only require a low electrical power, because of which the supply via the low-voltage vehicle electrical system is advantageous. In addition, significantly lower requirements with respect to the electrical safety are to be taken into consideration in the low-voltage range, because of which the low-voltage vehicle electrical system is also advantageous for this reason in a generic motor vehicle. The low-voltage vehicle electrical system can generally comprise a separate electrical energy accumulator, for example, a vehicle battery or the like, which is preferably also designed as a rechargeable battery. Such electrical energy accumulators are frequently designed as lead-acid rechargeable batteries. In addition, of course, they can also be designed as lithium-ion rechargeable batteries. The electrical energy accumulator can alternatively or additionally also comprise one or more capacitors here.

In the intended operation of the motor vehicle, it is generally provided that the high-voltage vehicle electrical system and the low-voltage vehicle electrical system are energetically coupled by means of a vehicle energy converter. Electrical energy can thus be exchanged between the two vehicle electrical systems. The vehicle energy converter is typically designed as a DC/DC converter. It is generally designed at least for the purpose of providing electrical energy of the high-voltage vehicle electrical system for the low-voltage vehicle electrical system. Unidirectional operation is thus ensured. However, an energy conversion in the opposite direction is preferably also enabled, so that the vehicle energy converter enables bidirectional energy conversion.

During charging operation, in which the motor vehicle is energetically coupled via the charging device to the charging station and acquires energy therefrom, it is generally provided that the low-voltage vehicle electrical system is kept active, so that a certain functionality of electrical devices of the low-voltage vehicle electrical system can also be ensured during the charging operation. Nevertheless, only a comparatively low electrical power is generally required for this purpose. The vehicle energy converter is generally designed for providing an electrical power which is multiple times greater, in contrast, which can be greater by a factor of 10 or more than a required total power of the low-voltage vehicle electrical system during the charging operation, however. This has the result that the vehicle energy converter is operated in an unfavorable conversion mode because of the low power to be provided in relation to its rated power, so that it then provides an unfavorable efficiency. This has proven to be disadvantageous as a whole for charging operation. For example, EP 2 631 105 A1 discloses such a motor vehicle. In addition, for example, DE 10 2014 201 581 A1 discloses a vehicle electrical system isolating circuit for DC voltage converters and a method for isolating a vehicle electrical system from a DC voltage converter and also DE 10 2010 026 130 A1 discloses a connecting device and a method.

SUMMARY

The invention is therefore based on the problem of enabling improved charging operation in a motor vehicle which is energetically coupled to the charging station.

With respect to a generic charging device, it is proposed in particular that it have a low-voltage terminal for connection to a low-voltage vehicle electrical system of the motor vehicle and an electronic auxiliary coil, which is magnetically coupled to the main coil and electrically coupled to the low-voltage terminal, and which is designed to provide electrical energy for the low-voltage vehicle electrical system.

With respect to a generic motor vehicle, it is proposed in particular that the charging device be designed according to the invention and have a low-voltage terminal connected to the low-voltage vehicle electrical system.

The invention is based on the concept that by providing the auxiliary coil, an energy supply of the low-voltage vehicle electrical system can be achieved alternatively from the vehicle energy converter, so that the energy converter operated in the unfavorable operating mode during the charging operation is not required. It can then be deactivated, so that the power loss thus caused can be substantially saved. The invention uses the advantage in this case that an auxiliary voltage already adapted with respect to the electrical voltage can be provided by the auxiliary coil, which can be used to supply electrical energy to the low-voltage vehicle electrical system. Because complex DC/DC conversion does not have to be required for this purpose, the disadvantageous unfavorable efficiency of the vehicle energy converter linked thereto can also be substantially avoided. This is because the electrical voltage can already be provided by the auxiliary coil in a dimension adapted in such a way that it can preferably be used without further transformation for the low-voltage vehicle electrical system. It is thus possible using the invention to provide electrical energy at high efficiency for the low-voltage vehicle electrical system during charging operation, so that the unfavorable operation of the vehicle energy converter can be reduced, if not even completely avoided. The auxiliary coil is preferably designed in such a way that it is capable of providing the required power of the low-voltage vehicle electrical system during charging operation, so that the vehicle energy converter can be completely deactivated.

The invention uses the effect in this case that the inductance is generally provided in any case in the charging device energy converter. It uses a main coil, which provides a magnetic field, which is used for storing energy, so that the desired energy conversion function can be provided. Since the main coil generally has to be designed for a large conversion power, a corresponding magnetic field is also available. By magnetically coupling the auxiliary coil, a comparatively smaller energy proportion can be taken from this magnetic field, which can be used for providing the electrical power for the low-voltage vehicle electrical system. It is thus possible by way of the invention to provide a high-efficiency energy supply during charging operation with little additional technical expenditure.

The magnetic coupling can be implemented, for example, in that the main coil and the auxiliary coil are arranged in a suitable alignment in relation to one another, for example, in the longitudinal direction, so that the magnetic flux of the main coil can also at least partially permeate the auxiliary coil. In addition, of course, there is also the option that the main coil and the auxiliary coil are arranged concentrically in relation to one another, for example, by arranging the auxiliary coil coaxially in relation to the main coil in a larger diameter than the main coil or vice versa or the like. The magnetic coupling can also be established at least partially using a ferromagnetic material, using which at least a part of the magnetic flux of the main coil can be coupled into the auxiliary coil. Corresponding ferromagnetic elements, for example, a yoke or the like, can be provided for this purpose.

The charging terminal of the charging device can comprise a plug connector which enables a detachable electromagnetic coupling to be established to a charging cable. However, the charging terminal can also comprise an electrical coil, which can be magnetically coupled to an electrical coil of the charging station, to be able to establish the energetic coupling inductively in this manner.

Overall, an energy flow from the charging station to the charging device generally has to be provided. If needed, however, it can also be provided that an opposing energy flow is enabled, so that energy is delivered to the charging station from the high-voltage vehicle electrical system of the motor vehicle.

It has proven to be particularly advantageous if at least a part of the main coil and the auxiliary coil are provided by an electrical transformer. The main coil can be formed completely by a primary winding of the transformer, for example. The auxiliary coil can then be formed, for example, by a secondary winding of the transformer. Of course, it is also possible that the primary winding, which provides the main coil, only forms a part of the main coil and a further part of the main coil is a coil separate therefrom, which is connected in series-parallel to the primary coil of the transformer. A coupling dependent on the desired power to be provided can thus be implemented in a simple manner. It is thus possible to be able to adapt the energy supply for the low-voltage vehicle electrical system to a respective required total power during a charging process of a specific motor vehicle. A high level of flexibility with respect to different motor vehicles can thus be achieved.

Furthermore, it is proposed that the charging device energy converter be designed to electrically isolate the charging terminal, the high-voltage terminal, and/or the low-voltage terminal from one another. It is preferably at least provided that the low-voltage terminal is electrically isolated from the charging terminal and the high-voltage terminal. This is particularly advantageous for reasons of electrical safety. Nonetheless, it can also be provided that alternatively or additionally the charging terminal and the high-voltage terminal are electrically isolated from one another. This can also have a favorable effect on the electrical safety and also on the electromagnetic compatibility. It is particularly advantageous if all three terminals are electrically isolated from one another. This can be achieved by suitable configurations, for example, by means of transformers or the like.

It is proposed according to one refinement that the auxiliary coil be designed for a rated power which is adapted to the total power of the low-voltage vehicle electrical system during charging operation of the charging device. The auxiliary coil can thus be designed adapted to the specific requirements of the low-voltage vehicle electrical system. The auxiliary coil thus does not have to be formed larger than is necessary for the energy supply of the low-voltage vehicle electrical system during the intended charging operation. The total power can be approximately 200 W, for example, in this operating state. A more compact configuration can thus be achieved overall, so that the implementation of the invention is enabled in a simple manner even in already existing designs of charging devices.

It is furthermore proposed that the charging device have a detector unit, which is designed to detect the energetic coupling of the charging device to the charging station and to output a corresponding charging signal. This design has the advantage that a signal is available which can be used to control the vehicle energy converter appropriately. Because the detector unit detects the energetic coupling to the charging station, it is possible that it can be established when the energy supply via the vehicle energy converter is no longer required. The charging signal can therefore be used to at least partially deactivate the vehicle energy converter. The unfavorable operation of the vehicle energy converter during the charging operation can thus be avoided or at least reduced. In this case, the energy supply takes place via the auxiliary coil and the low-voltage terminal of the charging device. The auxiliary coil thus provides an alternative energy supply for the low-voltage vehicle electrical system during the charging operation, and does so instead of the vehicle energy converter.

Furthermore, it is proposed that the auxiliary coil be connected via an auxiliary rectifier to the low-voltage terminal. This design is based on the circumstance that the auxiliary coil generally provides an AC voltage. The low-voltage vehicle electrical system is generally a DC voltage vehicle electrical system, however, as is the high-voltage vehicle electrical system. To be able to use the electrical energy provided by the auxiliary coil in the low-voltage vehicle electrical system, the auxiliary rectifier is therefore preferably provided, which provides the rectification function, so that the electrical energy provided by the auxiliary coil can be supplied to the low-voltage vehicle electrical system. The auxiliary rectifier is preferably comprised by the charging device. However, it can alternatively or additionally also be comprised by the low-voltage vehicle electrical system. The auxiliary rectifier can comprise at least one diode, in particular a semiconductor diode, to be able to provide the rectification function. The auxiliary rectifier is preferably designed as a bridge rectifier, however. Additionally or alternatively to the diodes, of course, controllable semiconductor elements, in particular semiconductor switches, for example, transistors or the like, can also be provided, by means of which the desired rectification function can also be implemented. The auxiliary rectifier can optionally also be made capable of performing a voltage adaptation, for example, if the AC voltage provided by the auxiliary coil solely after rectification is not compatible with the operating voltage of the low-voltage vehicle electrical system. Such a voltage adaptation can be carried out, for example, by means of an integrated DC/DC converter or the like.

It has furthermore proven to be advantageous if the inductor is designed as a transformer and a primary winding of the transformer at least partially forms the main coil. This design has proven to be advantageous insofar as the charging terminal and the high-voltage terminal can be electrically isolated from one another. A voltage adaptation can also be achieved in this way at the same time. In addition, the magnetic flux, which is at least partially also capable of coupling to the auxiliary coil, can be provided using the transformer. The auxiliary coil can thus be a secondary winding of the transformer, so that the desired functionality can be implemented in a simple manner using a single component. It is possible in this case to arrange the individual coils, for example, windings of the transformer, on individual legs of a magnetic circuit and/or a ferromagnetic body. The respective magnetic coupling and thus also an energy flow can be set by the design of the individual legs. This design thus enables the desired functionality to be implemented in a simple and reliable manner.

In addition, it can be provided that the main coil is coupled via a main rectifier to the high-voltage terminal. The main rectifier can be designed like the auxiliary rectifier with respect to its structure. It has proven to be particularly advantageous in this case that the rectification function can also be implemented by the main rectifier, so that in the case of an AC voltage provided by the main coil, a corresponding DC voltage can also be provided at the high-voltage terminal. The main rectifier can additionally also be designed here to be able to perform a voltage adaptation.

The advantages and effects specified for the charging device according to the invention also apply, of course, to the motor vehicle equipped with the charging device according to the invention and vice versa.

The invention also comprises the combinations of the described embodiments.

The invention also includes refinements of the motor vehicle according to the invention which have features which have already been described in conjunction with the refinements of the charging device according to the invention. For this reason, the corresponding refinements of the motor vehicle according to the invention are not also described once again here.

BRIEF DESCRIPTION OF DRAWINGS

Exemplary embodiments of the invention are described hereafter. In the figures.

DETAILED DESCRIPTION

The exemplary embodiments explained hereafter are preferred embodiments of the invention. In the exemplary embodiments, the described components of the embodiments each represent individual features of the invention to be considered independently of one another, which each also refine the invention independently of one another and therefore are also to be considered to be part of the invention individually or in a combination other than that shown. Furthermore, the described embodiments can also be supplemented by further above-described features of the invention.

In the figures, functionally-identical elements are provided with the same reference signs in each case.

Figure 3:
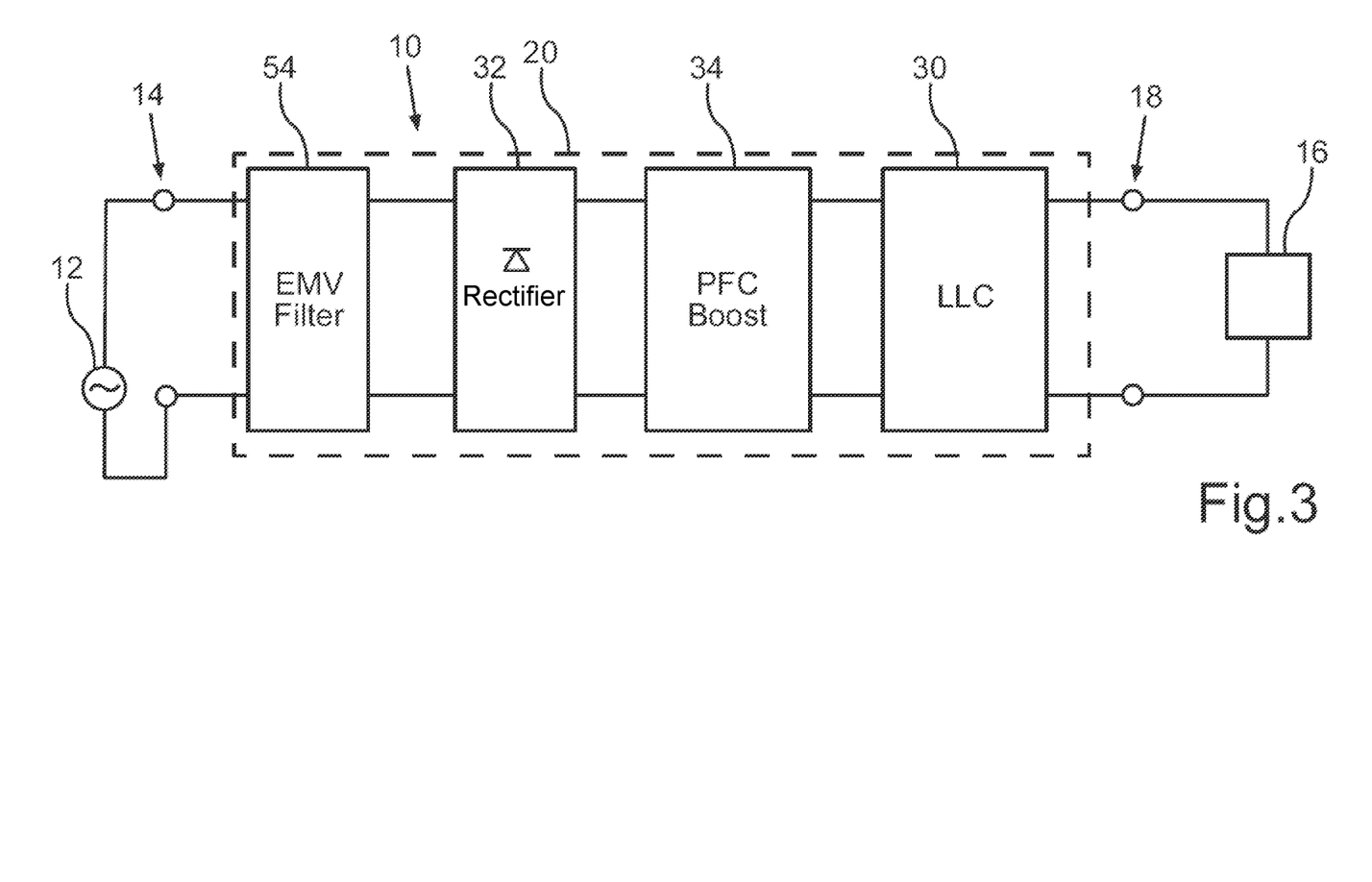
FIG. 3 shows a schematic block diagram of a fundamental configuration of the charging device according to FIG. 1.

FIG. 3 shows a schematic block diagram of a fundamental configuration of a charging device 10, as is typically provided with respect to the structure if the charging device 10 is designed to be connected to a motor-vehicle-external charging station 12, which provides an electrical AC voltage. In principle, a DC voltage can also be provided by the charging station 12, wherein the charging device 10 is then to be adapted accordingly.

The charging device 10 is designed to be arranged in a motor vehicle (not shown in greater detail), which is an electric vehicle in the present case. Of course, the motor vehicle can also be a hybrid vehicle or another motor vehicle. The motor vehicle is preferably an automobile, in particular a passenger automobile.

The charging device 10 accordingly comprises an EMC (electromagnetic compatibility) filter 54, which is directly connected to the charging terminal 14. A rectifier 32, using which the AC voltage provided by the charging station 12 is rectified, is connected to the EMC filter 54. The rectified voltage is supplied to a PFC (power factor control) step-up converter 34, which elevates the DC voltage provided by the rectifier 32 to a predetermined voltage value. The elevated DC voltage of the PFC step-up converter 34 is supplied to an LLC converter 36, which provides an AC voltage, which is rectified (FIG. 4) by means of a main rectifier 38 and provided to a high-voltage terminal 18, which is connected to a high-voltage vehicle electrical system 16 of the motor vehicle.

Figure 1:
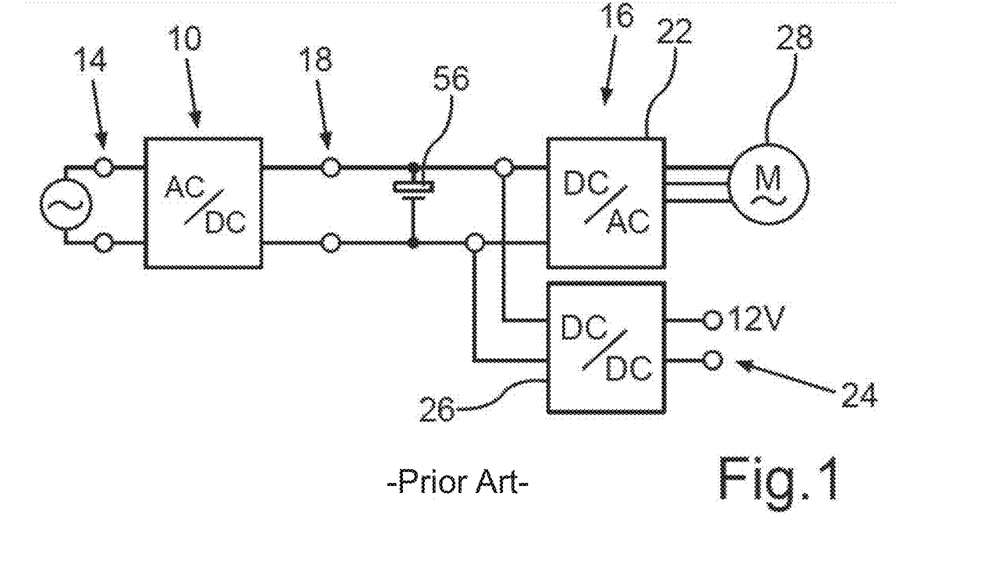
FIG. 1 shows a schematic block diagram of a charging device according to the prior art connected to a vehicle electrical system of an electric vehicle.

FIG. 1 shows a simplified illustration of the high-voltage vehicle electrical system 16 in conjunction with the charging device 10. It is apparent therefrom that the high-voltage vehicle electrical system 16 comprises an electrical energy accumulator like a high-voltage battery 56, to which an inverter 22 is connected as an electrical drive device, which provides a three-phase AC voltage for an electrical machine 28, which is used for driving the electric vehicle in the intended driving operation.

The rated voltage in the intended operation of the high-voltage vehicle electrical system 16 is approximately 400 V in the present case. The high-voltage voltage can also be selected deviating somewhat therefrom as needed, however, for example, it can be approximately 450 V or even approximately 800 V. The high-voltage vehicle electrical system 16 and the charging device 10 are then to be designed accordingly with respect to the electrical requirements.

Furthermore, a step-down converter 26 is connected to the high-voltage vehicle electrical system 16 as a vehicle energy converter, which is designed in the present case as a DC/DC converter. The step-down converter 26 provides a low-voltage DC voltage of approximately 12 V in the present case. A low-voltage vehicle electrical system 24 of the electric vehicle can be supplied with electrical energy in this way. It is not shown that the low-voltage vehicle electrical system 24 can also comprise an electrical energy accumulator like a rechargeable battery, which is designed in the present case as a lead-acid rechargeable battery. However, another electrical energy accumulator can also be provided here as needed.

During charging operation, the electric vehicle is parked at the charging station 12. Its charging device 10 is energetically coupled to the charging station 12 via the charging terminal 14 and a charging cable (not shown) detachably electromechanically coupled to the charging terminal 14. The charging station 12 can thus supply electrical energy to the electric vehicle, which can be used, for example, in particular for charging the high-voltage battery 56.

During the intended charging operation, it is generally provided that the low-voltage vehicle electrical system 24 is kept operationally ready. The step-down converter 26, which is designed in the present case, for example, for an electrical power of more than approximately 2 kW, is loaded in this case, for example, with a power of approximately 200 W, which is required in the low-voltage vehicle electrical system 24 during charging operation. A comparatively low electrical power is therefore applied to the step-down converter 26 and it therefore provides this power with an unfavorable efficiency of approximately 50% or even less. This is undesirable because power loss is unnecessarily generated and this lost power is then no longer available for the charging.

Figure 2:
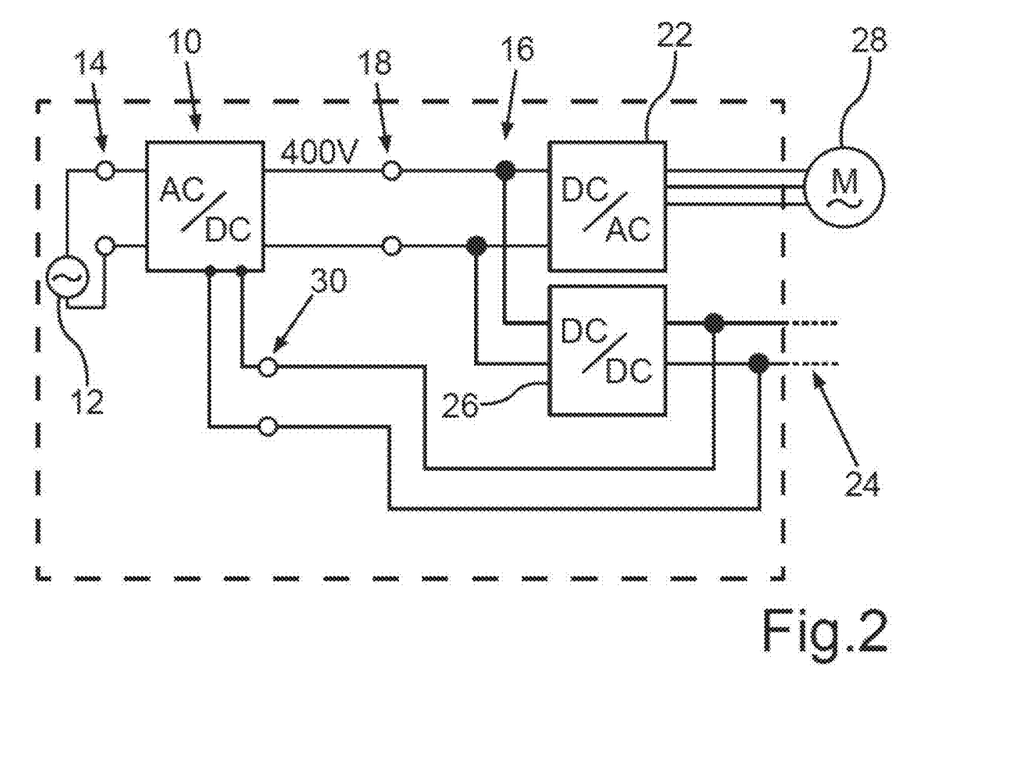
FIG. 2 shows a schematic block diagram of a charging device according to the invention connected to a vehicle electrical system of an electric vehicle.

FIG. 2 shows an illustration like FIG. 1, in which the charging device 10 now has a low-voltage terminal 30, however, which is connected to the low-voltage vehicle electrical system 24. The option thus exists during the intended charging operation, as already explained with respect to FIG. 1, to provide the electrical power required for the low-voltage vehicle electrical system 24 not using the step-down converter 26, but rather instead directly by way of the charging device 10. This enables the step-down converter 26 to be deactivated, so that is its unfavorable conversion operation can be avoided during the intended charging operation. The electrical power required for the low-voltage vehicle electrical system 24 can therefore be provided, preferably completely, directly by the charging device 10 via the low-voltage terminal 30.

Figure 4:
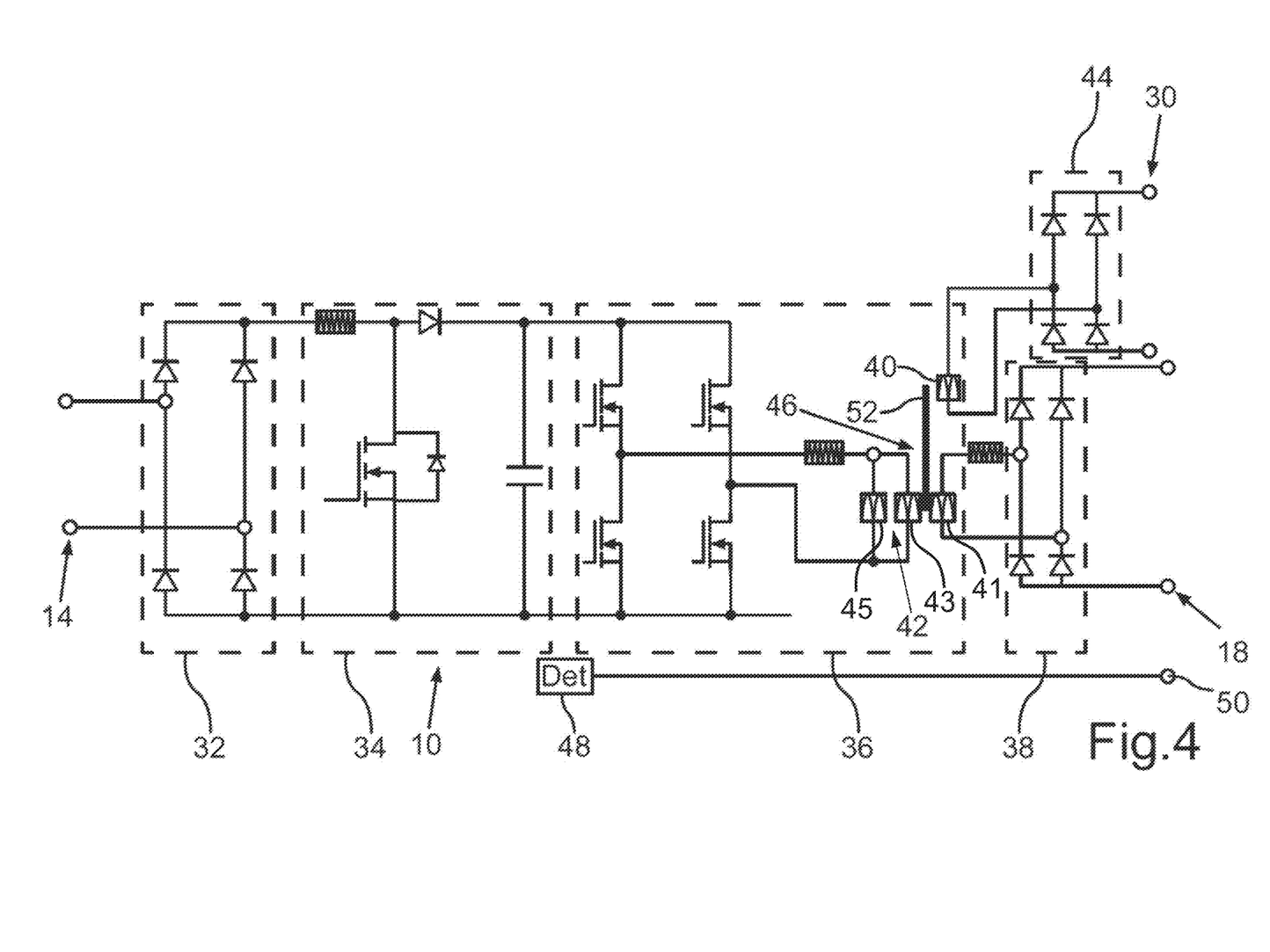
FIG. 4 shows a schematic circuit diagram of a fundamental circuit structure of the charging device according to FIG. 2.

Only the differences of the charging device 10 according to the invention are to be explained hereafter on the basis of FIG. 4. Reference is made to the above statements, in particular on FIGS. 1 and 3, for the more extensive functionalities.

FIG. 4 shows an option for implementing the invention according to FIG. 2. It can be seen that the charging device 10—as already explained above—comprises the charging terminal 14 and the high-voltage terminal 18. It is also provided in the present case that the charging device 10 comprises the EMC filter 54, the rectifier 32, the PFC step-up converter 34, the LLC converter 36, and the main rectifier 38, which together form the charging device energy converter 20. It can furthermore be seen on the basis of FIG. 4 that the LLC converter 36 comprises a transformer 46, which in the present case comprises two coils magnetically coupled via a ferromagnetic yoke 52, wherein a primary coil 43 of the transformer 46 forms a part of a main coil 42. A secondary coil 41, which is magnetically coupled via the yoke 52 to the primary coil 43, provides a converted AC voltage, which is rectified by means of the main rectifier 38 connected to the secondary coil 41, so that the corresponding high-voltage DC voltage is provided at the high-voltage terminal 18 connected to the main rectifier 38. Additionally, the primary coil 43 may only form part of the main coil 42, whereby a further part or second part 45 of the main coil 42 is formed separate from the primary coil 43 and connected in parallel to the primary coil 43 of the transformer 46.

Furthermore, an auxiliary coil 40 is magnetically coupled to the yoke 52, which is dimensioned with respect to its properties in such a way that it can supply the low-voltage vehicle electrical system 24 with electrical energy. To be able to substantially save energy-unfavorable conversions, it is provided that the auxiliary coil 40 provides an AC voltage which is rectified by means of an auxiliary rectifier 44 connected to the auxiliary coil 40 and provided at the low-voltage terminal 30 for the low-voltage vehicle electrical system 24. A voltage conversion can thus be substantially avoided. The total power of the low-voltage vehicle electrical system 24 required during the intended charging operation can thus be additionally and/or alternatively provided by the charging device 10 with a high efficiency, so that the step-down converter 26 can even be deactivated during the intended charging operation. The high power loss arising in the prior art due to the step-down converter 26 can thus be nearly completely avoided.

To control the step-down converter 26, the charging device 10 comprises a detector unit 48, by means of which it can determine the energetic coupling of the charging device to the charging station 12. A voltage sensor can be provided for this purpose, for example, which detects an electrical voltage provided by the charging station 12. The detector unit 48 provides a charging signal, by means of which the step-down converter 26 can be controlled, in dependence on the detected voltage. In the present case, it is provided that the step-down converter 26 is deactivated as soon the electrical voltage of the charging station 12 is detected.

Figure 5:
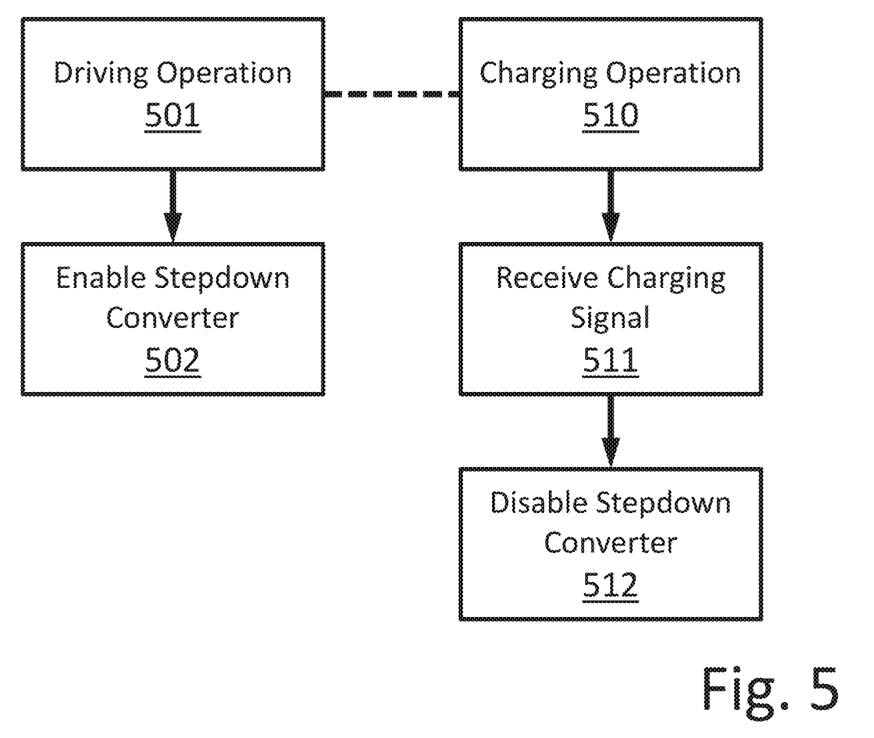
FIG. 5 shows a flow chart describing a control scheme according to the present invention.

FIG. 5 shows a flow chart illustrating the control scheme above. In step 501, if it is determined that the electric vehicle is undergoing a driving operation, stepdown converter 26 is enabled in step 502. Correspondingly, in step 510, if it is determined that the electric vehicle is undergoing a charging operation and in step 511 it is determined that a charging signal is present, such as that provided by detector unit 48, then the stepdown converter 26 is disabled in step 512.

Figure 6:
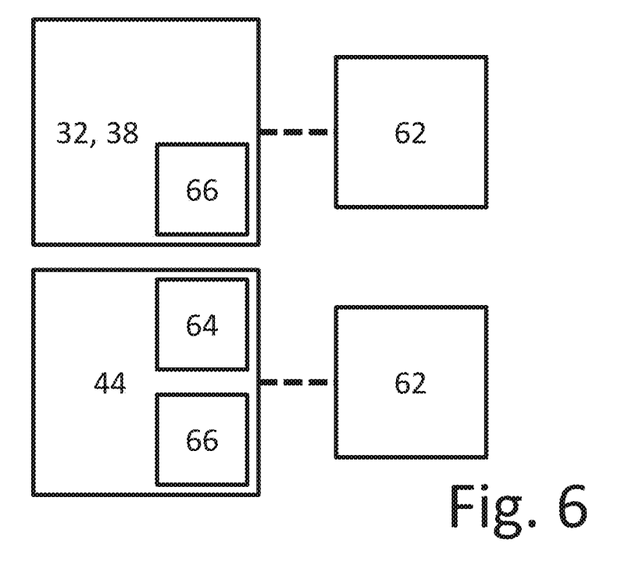
FIG. 6 shows schematic representations of possible configurations of rectifiers according to the present invention.

It is furthermore provided in the present exemplary embodiments that the rectifiers 32, 38, 44 are equipped with diodes to be able to provide the desired rectifier function. Alternatively or additionally, controllable semiconductors 66 can also be provided here, for example, transistors, thyristors, and/or the like, to be able to achieve an improved possible effect on the function of the rectification. In addition, such designs also enable an optional partial voltage adaptation if this should prove to be necessary. For this purpose, further passive electrical energy accumulators 62 such as inductors and/or capacitors can be coupled to the respective rectifiers, as shown in FIG. 6. Additionally or alternatively, the auxiliary rectifier 44 may have an integrated DC/DC converter 64 for performing voltage adaptation.

The transformer 46 can have a central ferromagnetic yoke 52, so that the windings, in particular the main coil 42 and the auxiliary coil 40, can be wound concentrically one over another. Of course, in alternative embodiments, it can also be provided that a separate ferromagnetic yoke is provided for one or more of the windings, which can be magnetically coupled accordingly to the respective other ferromagnetic yoke. The ferromagnetic yoke is preferably formed in the present case from a ferromagnetic material such as a ferrite or the like, which is suitable in particular for operation at high frequencies in the range of greater than 1 kHz. An operating frequency of the charging device energy converter 20 can be, for example, approximately 100 kHz, 500 kHz, or even 1 MHz.

Overall, the examples show how effective energy supply of the low-voltage vehicle electrical system 24 can be achieved by the invention during the intended charging operation. The exemplary embodiments are not to have a restrictive effect on the invention and are merely to explain it, however.

Figure 7:
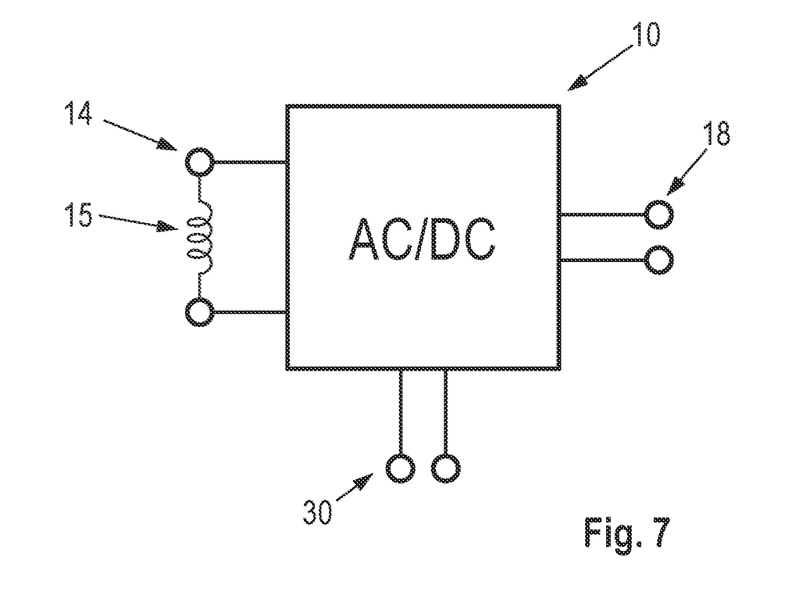
FIG. 7 shows a partial schematic circuit diagram of a further embodiment of the circuit depicted in FIG. 2.

FIG. 7 shows another possible embodiment of the circuit depicted in FIG. 2 in which terminal 14 further comprises an electrical coil 15 for establishing an inductive, energetic coupling with charging station 12.

The invention claimed is:

1. A charging device for a motor vehicle, comprising:
a charging terminal for an energetic coupling to a motor-vehicle-external charging station,
a high-voltage terminal for the electrical connection of the charging device to a high-voltage vehicle electrical system of the motor vehicle,
a low-voltage terminal for connection to a low-voltage vehicle electrical system of the motor vehicle,
a charging device energy converter electrically coupled to the charging terminal, the high-voltage terminal, and the low-voltage terminal,
a step-down converter which connects the high-voltage terminal to the low-voltage terminal on a side of the charging device energy converter opposite to that of the charging terminal, and
a detector unit, which is designed to detect the energetic coupling of the charging device to the motor-vehicle-external charging station and to output a corresponding charging signal,
wherein, during a driving operation, the step-down converter is enabled so as to allow for the low-voltage vehicle electrical system to be supplied with electricity by the high-voltage vehicle electrical system, and, during a charging operation and upon receipt of the charging signal, the step-down converter is disabled,
wherein the charging device energy converter has an electrical inductance as an electrical energy accumulator for converting electrical energy between the charging terminal, the high voltage terminal, and the low voltage terminal, the electrical inductance at least partially formed as an electronic main coil, the electronic main coil having a main coil circuit,
wherein the electrical inductance is designed as a transformer, and a primary winding of the transformer forms a first part of the main coil circuit,
wherein the main coil comprises a second part connected in parallel to the primary winding so that an energy supply of the low-voltage vehicle electrical system may be flexibly adapted to a coupling dependent on a desired power to be provided,
wherein the electrical inductance further comprises an electronic auxiliary coil which is magnetically coupled to the main coil, electrically coupled to the low-voltage terminal, and designed to provide electrical energy for the low-voltage vehicle electrical system,
wherein the electronic auxiliary coil is connected via an auxiliary rectifier to the low-voltage terminal, and the main coil is coupled via a main rectifier to the high-voltage terminal, wherein the main rectifier and the auxiliary rectifier each are configured to provide additional voltage adaptation, wherein the charging terminal comprises an electrical coil for inductive coupling with the motor-vehicle-external charging station, wherein, during the charging operation, the low-voltage vehicle electrical system is kept in an operationally ready state which consumes approximately ten percent or less of an expected power load of the low-voltage system during at least the driving operation, wherein the step-down converter is sized to efficiently convert energy at the expected power load and the electronic auxiliary coil is sized to efficiently convert energy for the operationally ready state, and wherein the charging device further comprises a third rectifier that interfaces with the charging terminal and is situated between an EMC (electromagnetic compatibility) filter and a PFC (power factor control) step-up converter.

2. The charging device as claimed in claim 1, wherein at least a part of the main coil as well as the electronic auxiliary coil are provided by an electrical transformer.

3. The charging device as claimed in claim 1, wherein the charging device energy converter is designed to electrically isolate the charging terminal, the high-voltage terminal and/or the low-voltage terminal from one another.

4. The charging device as claimed in claim 1, wherein the electronic auxiliary coil is designed for a rated power which is adapted to a total power of the low-voltage vehicle electrical system during charging operation of the charging device.

5. The charging device as claimed in claim 1, wherein the main rectifier and the auxiliary rectifier are each coupled to a respective energy accumulator consisting of an inductor or a capacitor.

6. The charging device as claimed in claim 1, wherein the main rectifier and the auxiliary rectifier each comprise at least one controllable semiconductor.

7. The charging device as claimed in claim 1, wherein the charging device energy converter operates at a frequency of approximately 100 kHz.

8. The charging device as claimed in claim 1, wherein the charging device energy converter operates at a frequency of approximately 500 kHz.

9. The charging device as claimed in claim 1, wherein the charging device energy converter operates at a frequency of approximately 1 MHz.

10. The charging device as claimed in claim 1, wherein the operationally ready state corresponds to a power of approximately 200 W, and the expected power load is more than approximately 2 kW.

11. The charging device as claimed in claim 1, wherein each of the main coil and the electronic auxiliary coil are provided with separate ferromagnetic yokes which are then magnetically coupled to each other.

12. A motor vehicle, comprising:
a high-voltage vehicle electrical system,
a low-voltage vehicle electrical system,
a charging device which has a high-voltage terminal connected to the high-voltage vehicle electrical system, a low-voltage terminal connected to the low-voltage vehicle electrical system, a charging terminal for an energetic coupling to a motor-vehicle-external charging station, and an electrical inductance as an electrical energy accumulator, the electrical inductance at least partially formed as an electronic main coil, the electronic main coil having a main coil circuit, and a step-down converter which connects the high-voltage terminal to the low-voltage terminal on a side of the charging device opposite to that of the charging terminal, and a detector unit, which is designed to detect the energetic coupling of the charging device to the motor-vehicle-external charging station and to output a corresponding charging signal, wherein, during a driving operation, the step-down converter is enabled so as to allow for the low-voltage vehicle electrical system to be supplied with electricity by the high-voltage vehicle electrical system, and, during a charging operation and upon receipt of the charging signal, the step-down converter is disabled, wherein the electrical inductance is designed as a transformer, and a primary winding of the transformer forms a first part of the main coil circuit, wherein the main coil comprises a second part connected in parallel to the primary winding so that an energy supply of the low-voltage vehicle electrical system may be flexibly adapted to a coupling dependent on a desired power to be provided, wherein the electrical inductance further comprises an electronic auxiliary coil electronic which is magnetically coupled to the main coil, electrically coupled to the low-voltage terminal, and designed to provide electrical energy for the low-voltage vehicle electrical system, wherein the electronic auxiliary coil is connected via an auxiliary rectifier to the low-voltage terminal, and the main coil is coupled via a main rectifier to the high-voltage terminal, wherein the main rectifier and the auxiliary rectifier each are configured to provide additional voltage adaptation, wherein the charging terminal comprises an electrical coil for inductive coupling with the motor-vehicle-external charging station, wherein, during the charging operation, the low-voltage vehicle electrical system is kept in an operationally ready state which consumes approximately ten percent or less of an expected power load of the low-voltage system during at least the driving operation, wherein the step-down converter is sized to efficiently convert energy at the expected power load and the electronic auxiliary coil is sized to efficiently convert energy for the operationally ready state, and wherein the charging device further comprises a third rectifier that interfaces with the charging terminal and is situated between an EMC (electromagnetic compatibility) filter and a PFC (power factor control) step-up converter.

13. The motor vehicle as claimed in claim 12, wherein the main rectifier and the auxiliary rectifier are each coupled to a respective energy accumulator consisting of an inductor or a capacitor.

14. The motor vehicle as claimed in claim 12, wherein the main rectifier and the auxiliary rectifier each comprise at least one controllable semiconductor.

15. The motor vehicle as claimed in claim 12, wherein the charging device converter operates at a frequency of approximately 100 kHz.

16. The motor vehicle as claimed in claim 12, wherein the charging device converter operates at a frequency of approximately 500 kHz.

17. The motor vehicle as claimed in claim 12, wherein the charging device converter operates at a frequency of approximately 1 MHz.

18. The motor vehicle as claimed in claim 12, wherein the operationally ready state corresponds to a power of approximately 200 W, and the expected power load is more than approximately 2 kW.

19. The motor vehicle as claimed in claim 12, wherein each of the main coil and the electronic auxiliary coil are provided with separate ferromagnetic yokes which are then magnetically coupled to each other.

* * * * *